Patented May 21, 1929.

1,714,052

UNITED STATES PATENT OFFICE.

HUGH McCURDY SPENCER, OF LOCKPORT, NEW YORK.

SIZED FIBROUS PRODUCT AND METHOD OF MAKING SAME.

No Drawing.  Application filed March 12, 1926.  Serial No. 94,330.

This invention relates to the sizing of fibrous products, such as paper, in order to vary its physical properties.

Heretofore it has been a common practice to precipitate a rosin size emulsion upon the fibres of the product by means of an aqueous solution of sulfate of alumina or of alums, particularly where the product is formed partially or largely of vegetable fibres. For example, the rosin size emulsions may be added to vegetable fibres that have been beaten with water in a beating engine, commonly called a "beater" or "Hollander" and, after the rosin size and vegetable or other fibres have been homogeneously mixed together with the water by the action of the beating engine, an aqueous solution of sulfate of alumina or of alums is added, which solution has the effect of precipitating the rosin size upon the fibres, so that the finished products made out of such fibres will be more water repellant and have greater stiffness than a sheet which is similarly produced except for the treatment of the fibres by the addition of the rosin size emulsion and the sulfate of alumina or alum solutions.

Owing to the strongly acidic nature of the sulfate of alumina, it has been found that such a material, when used with rosin size for the treatment of vegetable fibres, has a marked tendency to react chemically with the vegetable fibres in the finished product or sheet, with the result that a slow decomposition in the carbohydrates composing the vegetable fibres takes place, which gradually impairs the strength and quality of the finished sheets or other products made in this manner, thereby shortening their period of usefulness.

I have discovered that the rosin size emulsions may be precipitated upon the vegetable or other fibres in an equally satisfactory manner by the action of an aqueous colloidal solution of peptized aluminum hydroxide. This aluminum hydroxide may be added either before or after a rosin size emulsion is added to and well mixed with the wet fibres of vegetable origin, and the process of sizing carried on otherwise, as heretofore.

I have further found that with this improved precipitant for the rosin size emulsion in the manufacture of fibrous products such as paper, paper board, or other products consisting wholly or in part of vegetable fibres, an equally water repellant and an equally stiff sheet or product is obtained, and that the product is also generally more satisfactory and capable of a greater period of usefulness than the prior products.

The colloidal solution of aluminum hydroxide is much less acidic in its nature than the sulfate of alumina. For example, on an equivalent aluminum content, a colloidal solution of aluminum hydroxide may be two-thirds, or even more, less acidic than a corresponding solution of sulfate of alumina of the same aluminum content, and therefore the finished sheets or other products composed wholly or in part of vegetable fibres and sized with a rosin emulsion precipitated by a colloidal solution of aluminum hydroxide suffers less decomposition or other deleterious chemical reactions than is ordinarily the case where sulfate of alumina is used as a precipitant for the rosin size.

The aqueous colloidal solution of peptized aluminum hydroxide may be conveniently prepared by precipitating hydrated alumina from a solution of an aluminum salt, such as aluminum sulphate, by means of caustic soda and then passing carbon dioxide gas through the mixture thus obtained, or otherwise adding a suitable weakly acid substance until the coagulated or precipitated hydrate of alumina is peptized or partially solubilized to produce a liquid containing the hydrated alumina in colloidal or partially solubilized condition such that when diluted it readily decomposes to again reproduce the precipitate or coagulum of hydrated alumina. For further information concerning the preparation of this product for other purposes, reference is made to my prior United States Patent No. 1,513,566, granted October 28, 1924, and to my copending application, Serial No. 706,882, filed April 18, 1924.

It will be obvious that various changes in the specific details, which have been herein referred to by way of example in explaining the nature of the invention, may be made by those skilled in the art within the principle and scope of the invention as expressed in the appended claims.

What I claim is:—

1. In the paper making art, a method of coagulating a rosin emulsion which comprises mixing therewith a peptized colloidal solution of aluminum hydroxide.

2. A method of sizing fibrous products which includes treating the fibers with a peptized colloidal solution of aluminum hydroxide, 3. A method of sizing fibrous materials which includes treating the fibers in fluid suspension with a peptized colloidal solution of aluminum hydroxide.

4. A method of sizing fibrous materials which includes, forming a pulp in which the fibers are in suspension adding a peptized colloidal solution of aluminum hydroxide to the pulp, and agitating the resulting mixture to effect a thorough distribution of the aluminum hydroxide.

5. A method of sizing fibrous materials which includes treating the fibers with a peptized colloidal solution of aluminum hydroxide and a rosin emulsion.

6. A method of sizing fibrous materials which includes treating the fibers in fluid suspension with a peptized colloidal solution of aluminum hydroxide and a rosin emulsion.

7. A method of sizing fibrous materials which includes, forming a pulp in which the fibers are in suspension, adding a peptized colloidal solution of aluminum hydroxide and a rosin emulsion to the pulp, and agitating the mixture.

8. A method of sizing fibrous products which includes treating the fibers with an emulsion containing particles which have negative electrical charges and a peptized colloidal solution in which the particles have positive electrical charges.

9. A method of sizing fibrous products which includes treating the fibers with a rosin emulsion and a peptized colloidal solution in which the particles have positive electrical charges.

10. An improved product containing fibers upon which rosin has been precipitated by peptized aluminum hydroxide.

11. An improved product containing fibers upon which a sizing material has been precipitated by a peptized solution containing positively charged particles.

12. An improved product containing fibers which have been treated with a peptized colloidal solution of aluminum hydroxide.

HUGH McCURDY SPENCER.